(12) United States Patent
Sukthankar et al.

(10) Patent No.: US 9,619,521 B1
(45) Date of Patent: Apr. 11, 2017

(54) CLASSIFICATION USING CONCEPT RANKING ACCORDING TO NEGATIVE EXEMPLARS

(71) Applicant: Google Inc., Mountain View, CA (US)

(72) Inventors: Rahul Sukthankar, Orlando, FL (US); Jay Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 14/142,976

(22) Filed: Dec. 30, 2013

(51) Int. Cl.
*G06F 17/30* (2006.01)
*G06N 99/00* (2010.01)

(52) U.S. Cl.
CPC ....... *G06F 17/3053* (2013.01); *G06N 99/005* (2013.01)

(58) Field of Classification Search
CPC combination set(s) only.
See application file for complete search history.

(56) References Cited

U.S. PATENT DOCUMENTS

| 8,819,024 B1* | 8/2014 | Toderici | G06F 17/30731 707/740 |
| 2011/0029529 A1* | 2/2011 | Knight | G06F 17/30713 707/737 |
| 2013/0097176 A1* | 4/2013 | Khader | G06Q 30/0282 707/748 |

OTHER PUBLICATIONS

Siva et al.,"In Defence of Negative Mining for Annotating Weakly Labelled Data", Proceedings of the 12th European Conference on Computer Vision, pp. 594-608, Oct. 7-13, 2012.
Yagnik et al.,"Learning People Annotation from the Web via Consistency Learning", Proceedings of the International Workshop on Multimedia Information Retrieval, pp. 285-290, Sep. 2007.

* cited by examiner

*Primary Examiner* — Shyue Jiunn Hwa
(74) *Attorney, Agent, or Firm* — Fish & Richardson P.C.

(57) ABSTRACT

A segmentation annotation technique for media items is disclosed herein. Given a weakly labeled media item, spatiotemporal masks may be generated for each of the concepts with which it is labeled. Segments may be ranked by the likelihood that they correspond to a given concept. The ranked concept segments may be utilized to train a classifier that, in turn, may be used to classify untagged or new media items.

13 Claims, 5 Drawing Sheets

CLASSIFICATION USING CONCEPT RANKING ACCORDING TO NEGATIVE EXEMPLARS

BACKGROUND

The ease of authoring and uploading video or other content (e.g., images, audio, etc.) to the Internet creates a vast resource for computer vision research, particularly because Internet videos or other content are frequently associated with semantic tags that identify visual concepts appearing in the video or other content. However, since tags are not spatially or temporally localized within the video, such videos cannot be directly exploited for training traditional supervised recognition systems.

BRIEF SUMMARY

According to an implementation of the disclosed subject matter, a system is provided that includes a database for storing a one or more media items and a processor connected thereto. The processor may be configured to obtain the one or more media items. Each media item may be identified as a concept media item or a non-concept media item. The processor may segment each of the media items. For each non-concept segment, the processor may identify a closest concept segment and rank each concept segment based on a number of instances in which it is closest to a non-concept segment.

In an implementation, a processor may obtain one or more media items. Each media items may be identified as a concept media item or a non-concept media item. The processor may segment each of the media items. For each non-concept segment, a closest concept segment may be identified. Each concept segment may be ranked based on a number of instances in which it is closest to a non-concept segment.

Concept ranking according to negative exemplar ("CRANE") techniques and systems as disclosed herein may provide for robust classification of content such as audio, video, and images. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Several methods have recently been proposed for high-quality, unsupervised spatiotemporal segmentation of videos. The computational efficiency of some of these approaches may make it feasible to segment large numbers of videos, such as videos available on the Internet, in a stored or hosted collection, or the like. Spatiotemporal segments may be leveraged for a variety of tasks in video understanding, including event detection, human motion volume generation, human activity recognition, and object segmentation. In one example technique, object segmentations may be generated on a weakly-labeled content (e.g., video) data. Weakly-labeled content may refer to a label applied to a particular content for which the label may refer to only a portion of the content. For example, a video labeled as "Sebas Lettev wins F1 race" may only contain a few frames that show Sebas Lettev or his racecar. Typically, this utilizes variations on standard supervised methods (e.g., linear classifiers and multiple-instance learning). Similarly, a noisy label may refer to instances where the label is unreliable. For example, the video of Sebas Lettev may actually be a video of Linus Benedict.

Discriminative segment annotation from weakly labeled data shares similarities with Multiple Instance Learning ("MIL"). In MIL, labeled bags of instances are provided, where a positive bag contains at least one positive instance, and a negative bag contains no positive instances. MIL is more constrained than the disclosed technique, since the assumptions regarding the contents of each "bag" may not be true due to label noise (which is typically present in video-level tags, for example). In particular, algorithms must contend with positive videos that actually contain no concept segments as well as rare cases where some concept segments appear in negative videos.

As disclosed herein, methods and systems are provided that may generate pixel-level concept annotations for a weakly labeled video or other type of content (such as an image or an audio segment). An example of the overall process will be described in reference to a video that is weakly tagged with a concept "dog." The video-level tag suggests that at least some segments of the video correspond to the concept (i.e., "dog") while most segments probably do not. The video may show a dog on a mat on a floor. The video may be processed using a standard unsupervised spatiotemporal segmentation method that aims to preserve object boundaries. In each frame post spatiotemporal segmentation, segments representing the floor, the mat, and the dog may be obtained or delineated. For example, the dog may be defined by multiple segments based on the movement of the dog from one frame to the next and/or variation in its coat color. As disclosed herein, each segment within the video may be classified as containing the concept with which the entire video was labeled, which may be denoted herein as concept segments, or as not containing the concept, which may be denoted herein as background segments, such as segments showing the floor or mat. Given the varied nature of content such as videos, assumptions about the relative frequencies or spatiotemporal distributions of segments from the two classes may not be reliable, within a frame or across the video. Similarly, each video may contain more than a single instance of the concept. Thus, the dog may not separable from a complex background using unsupervised methods.

As stated above, spatiotemporal segments for each video may be obtained. Each segment may be a spatiotemporal (3D) volume that is represented as a point in a high-dimensional feature space using a set of standard features computed over the segment. Specifically, for a particular concept c, a dataset represented by $\{\langle s_1, y_1 \rangle, \ldots, \langle s_N, y_N \rangle\}$ may be obtained, where $s_i$ refers to segment i, and $y_i \in \{-1, 1\}$ is the label for segment i. The label may be positive if the segment was extracted from a video being weakly-labeled as containing concept c and negative otherwise. The set P represents the set of all instances with a positive label, and the set N the set of all negative instances. Since the negative data was weakly labeled with concepts other than c, it may be assumed that the segments labeled as negative are, with rare exceptions, correctly labeled. The positive segments P that are concept segments and those that are background segments may be determined as disclosed herein.

A variety of methods may be utilized to annotate the segments in a given set of weakly labeled content (e.g., videos). For example, given a set of 100 videos containing dogs, P may denote the segments extracted from the set. Some subset of the segments may contain a concept (e.g., the dog), which may be represented by $P_C$, and the remaining subsets, represented by $P_b = P \setminus P_C$, may correspond to background concepts (i.e., the non-dog portions of the videos). As disclosed herein, the segments in $P_C$ may be identified and separated from the majority of segments in $P_b$. In some configurations, a score may be associated with each segment and the segments may be ranked such that those segments in $P_C$ may have a higher rank relative to those segments in $P_b$.

The elements of $P_C$ may be ranked in decreasing order of a score, $S(s_i)$ such that top-ranked elements correspond to $P_C$. Thresholding at a particular rank generates a partition that separates segments that contain the concept and segments that do not contain the concept (e.g., may contain non-concept segments and those concept segments that are below the threshold).

Standard, fully-supervised methods, such as Support Vector Machines ("SVM"), may learn a discriminative classifier to separate positive from negative data, given instance-level labels. Such methods can be similar to the weakly supervised setting of segment annotation by propagating video-level labels to segments. In other words, a discriminative classifier may be used to separate P from N. However, because $P = P_C \cup P_b$, the background segments from positively tagged videos, $P_b$ (which are typically the majority), may be label noise.

Negative Mining ("NM") may be treated as a discriminative method to identify $P_C$. Distinctive concept segments may be identified as those among P whose nearest neighbor among N is as far as possible. Operationally, this results in the following score for segments:

$$S_{MIN}(s_i) = \min_{t \in N}(\text{dist}(s_i, t)) \qquad \text{Equation 1}$$

A CRANE technique as disclosed herein may operate on the distances between weakly tagged positive and negative segments. Unlike NM, CRANE iterates through the segments in N, and each such negative instance penalizes nearby segments in P. Concept segments in P are those that are far from negatives (and therefore less penalized). While several algorithms can incorporate CRANE, an example of a CRANE process can be characterized by the following segment scoring function:

$$S_{CRANE}(s_i) = -\Sigma_{z \in N} 1[s_i = \arg\min_{t \in P}(\text{dist}(t,z))] \cdot f_{cut}(\text{dist}(s_i,z)) \qquad \text{Equation 2}$$

Where $1(\cdot)$ in Equation 2 denotes the indicator function and $f_{cut}(\text{dist}(s_i, z))$ is a cutoff function over an input distance. As in other contexts, an indicator function may be defined to evaluate as 1 if the argument of the function is true, and 0 if the argument is false.

Figure 4:
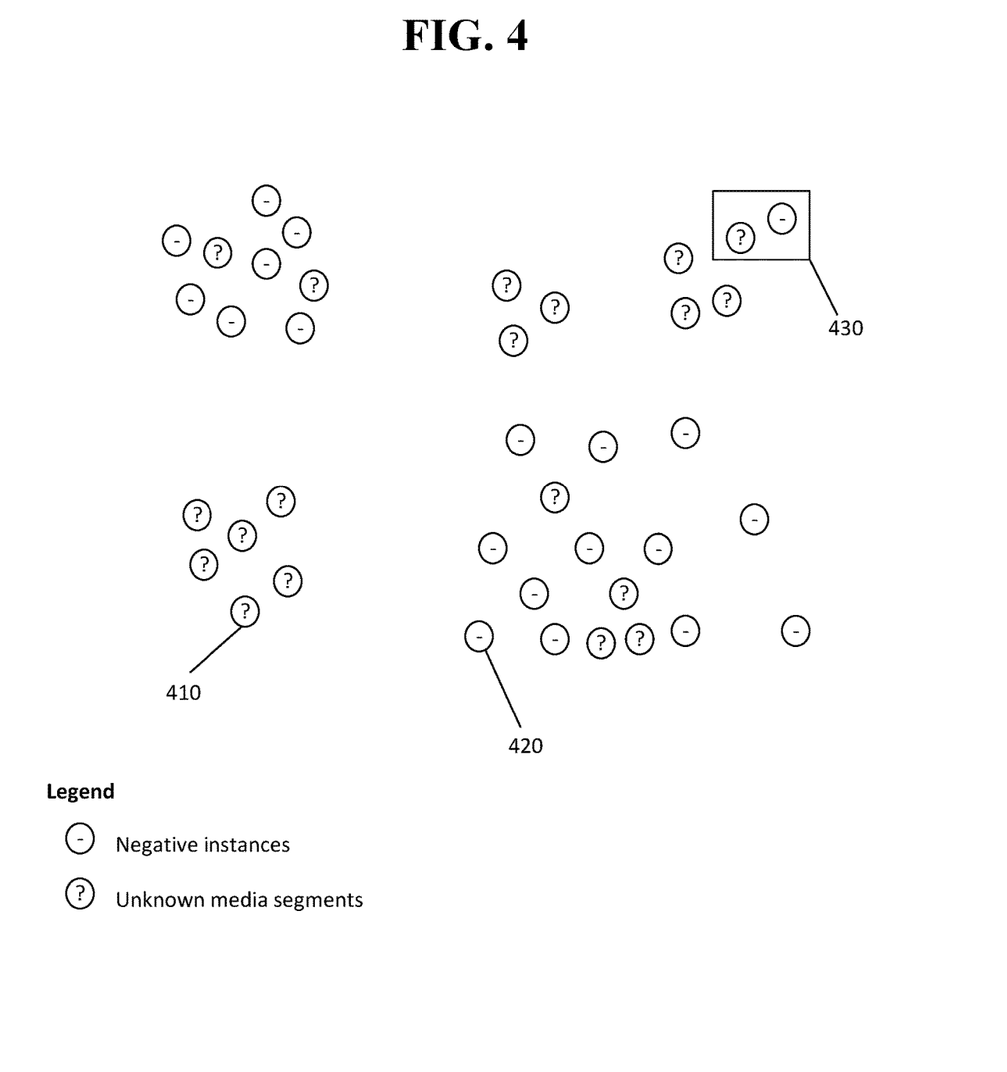
FIG. 4 is an example representation of how a CRANE technique may operate in embedded space as disclosed herein.

FIG. 4 is a schematic representation of segments in feature space that illustrates operation of a CRANE technique. Background segments in positive content (e.g., videos) may fall near one or more segments from negative videos in feature space. The nearest neighbor to every negative instance is assigned a penalty $f_{cut}(\cdot)$. Consequently, such segments may be ranked lower than other positives. Since concept segments are rarely the closest to negative instances, they may be ranked higher due to being penalized less often than background segments. FIG. 4 also shows an example of why a CRANE process may be more robust than NM or similar techniques to label noise among negative videos. Consider the points in the box shown at 430 of FIG. 4. Here, an unknown segment 410, $s_i$ is very close to a negative instance 420 that may have come from an incorrectly tagged video, for example. This single noisy instance will cause NM to irrecoverably reject $s_i$. By contrast, a CRANE process as disclosed herein will assign a small penalty $s_i$ for its proximity and, in the absence of corroborating evidence, from other negative instances 420, $s_i$'s rank will not change significantly. Thus, the associated segment still may be properly considered as a concept segment, despite being close to a single non-concept segment.

CRANE techniques and systems as disclosed herein possess several properties that make them particularly suitable to practical implementations. First, as mentioned above, CRANE generally is robust to noise, whether from incorrect labels or distorted features. Second, CRANE is explicitly designed to be parallelizable, enabling it to employ large numbers of negative instances. CRANE enforces independence among negative instances. This property enables the various computations used in a CRANE process to be decomposed over a large number of machines by replicating the positive instances, partitioning the (much larger) negative instances, and aggregating the resulting scores.

CRANE may be employed to identify concept segments from weakly labeled content. For example, CRANE may be applied directly in instances where target videos are already weakly tagged. CRANE may be used to rank all of the segments in the positive set according to this score. Thresholding the list at a particular rank may create a partitioning into $P_C$ and $P_b$. As another example, CRANE may be used to generate strongly supervised training data from a weakly labeled dataset in instances where the target videos are untagged. The classifier obtained in this case may be used to separate concept from non-concept segments in the target videos. A large number of weakly tagged positive and negative videos may be obtained and from which a set of segment-level classifiers may be learned that can be applied to arbitrary weakly tagged test videos.

Figure 5:
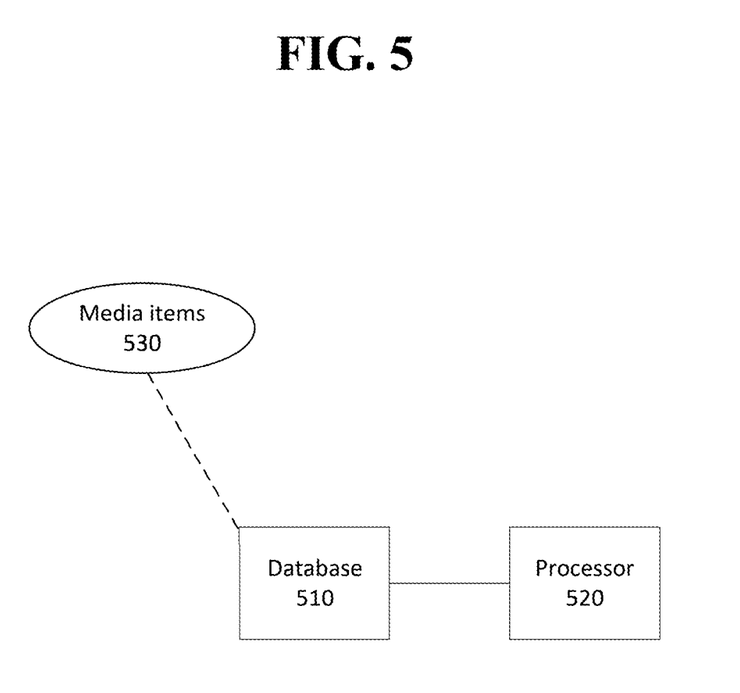
FIG. 5 is an example system to rank segments according to an implementation disclosed herein.

In an implementation, an example of which is provided in FIG. 5, a system is provided that includes a database 510 and a processor 520. The database may store one or media items 530. A media item 530 may refer to, for example, an audio file, a video, or an image. For example, the database 510 may contain a collection of user-provided or -created videos. A processor 520 may be connected, directly or indirectly, to the database 510. The processor 520 may obtain the one or more media items 530, for example, from the database. Obtaining one or more media items 530 may refer selecting a portion of the total media items stored in the database. It may refer to uploading or placing the media items 530 in the database 510 for storage.

The processor 520 may identify each of the media items 530 as a concept media item or a non-concept media item. As described above, a concept may refer to a semantic tag that refers to some visual feature in the media item 530. For example, a database 510 may store user generated video content. Users may have tagged the uploaded content. The tags provided by the users for the videos may or may not be correct and may be referred to as weakly labeled. Thus, a video that may be identified as being a non-concept media item may in fact contain the concept. However, because such false negatives are relatively low compared to the entire pool of non-concept-identified videos, the overall impact on subsequent steps is minimal.

The processor 520 may obtain segments for each of the media items. Segmentation may refer to spatiotemporal segmentation in which a segment of, for example, a video frame is internally consistent. For example, a mat shown in a video might be of a relatively uniform texture and color and would therefore likely form a single segment. Segmentation of the media items may be performed using other methods as well. For example, video frame or image may be segmented into defined "chunks" such as an eight by eight pixel block. Thus, segments may be derived from concept media items and non-concept media items.

For each non-concept segment, the processor 520 may identify a closest concept segment. As shown in FIG. 4, the segments may be represented in a feature space. As described above, any time a non-concept media item has as its closest media item a concept media item, it may penalize (see Equation 2) the concept segment. In some configurations, it may simply be that the concept segment accrues a point and in a subsequent ranking step, concept segments with the lowest number of points are considered as more likely to contain the concept. Each concept segment may be ranked based on a number of instances in which it is closest to a non-concept segment. As FIG. 4 indicates, those concept segments that are closest to other concept segments likely represent the concept while those concept segments that are nearest to non-concept segments likely represent background portions of the concept media item. For example, in a video labeled by a user as, "dog playing in pool," most of the video frames (and segments) may not contain the concept, "dog." Thus, most segments arising from such a concept video may be closer in feature space to non-concept segments. Those portions of the concept video that are closest to other concept video segments where "dog" is the concept are likely actual segments of the concept or "dog" in this case. In some configurations, a portion of ranked concept segments may be selected below a threshold value and each ranked concept segment within the selected portion may be labeled as a non-concept media item.

A classifier may be trained based on at least a portion of the ranked concept segments and the non-concept segments. Higher-ranked concept segments may correspond to a higher likelihood of a segment containing the concept. As stated above, a threshold value may be selected based on how discriminating of a classifier is desired. The classifier may be trained on all of the ranked concept segments in some configurations. Concept segments below a threshold rank may be used as non-concept segments to train the classifier. The closest concept segment may be identified based upon a pairwise distance matrix of all segments of the media items in the feature space. Utilizing an implementation disclosed herein, for example, one may be able to distinguish a miniature dachshund from a corgi, instead of merely determining that a dog exists in a media item. A new media item may be classified based on the trained classifier. For example, a new video for which no information is available may be labeled as containing a dog concept using the classifier trained according to an implementation disclosed herein. More specifically, the classifier may denote specific frames and/or portions within the frames in which a dog was detected.

Figure 6:
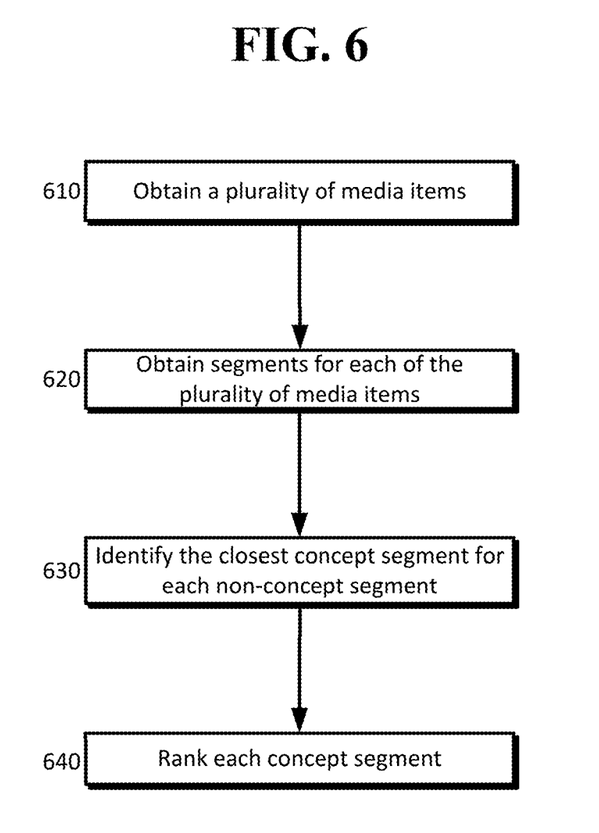
FIG. 6 is an example process to rank segments according to an implementation disclosed herein.

According to an implementation, an example of which is provided in FIG. 6, a processor may obtain one or more media items at 610. As described above, each of the media items may be identified as a concept media item or a non-concept media item. The processor may obtain segments for each of the media items at 620. For example, in some configurations the processor may segment the media items using, for example, spatiotemporal segmentation, edge recognition, color patterns, defined segment sizes, etc. as disclosed above. For each non-concept segment, a closest concept segment may be identified at 630. Each concept segment may be ranked at 640 based on a number of instances in which it is closest to a non-concept segment. In some configurations, a classifier may be trained using a machine learning technique as described earlier. For example, if concept segments are ranked based on their distance from non-concept segments (i.e., the highest ranked concepts segments are those that are least often nearest to a non-concept segment), a classifier may be trained by applying a machine learning technique to a portion of the highest ranked concept segments and/or the non-concept segments.

Figure 1:
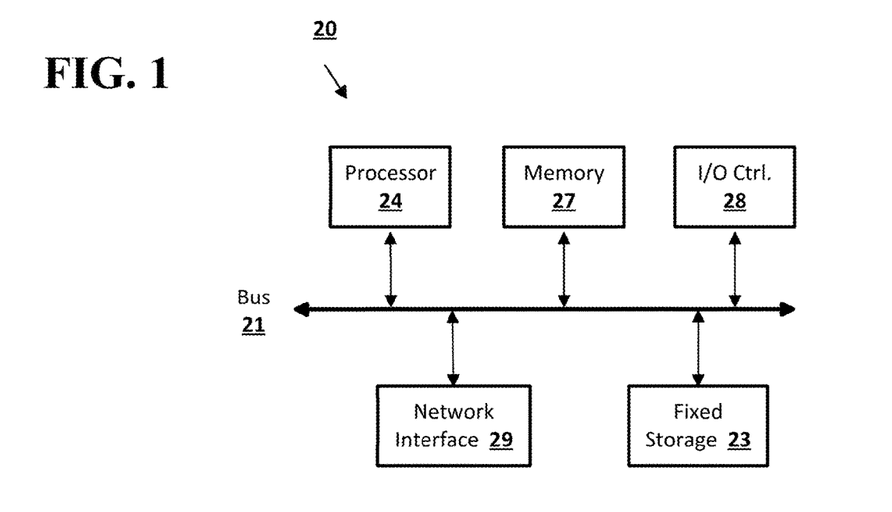
FIG. 1 shows a computer according to an implementation of the disclosed subject matter.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
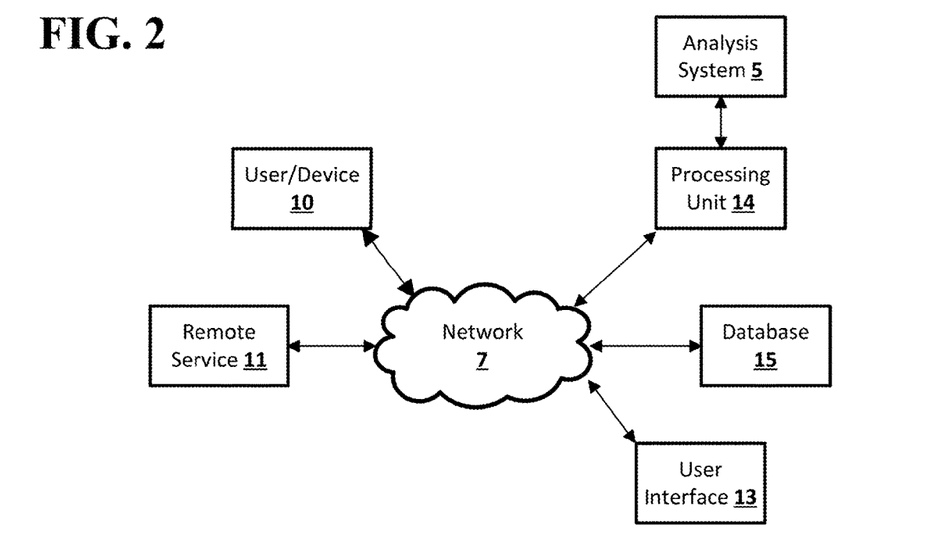
FIG. 2 shows a network configuration according to an implementation of the disclosed subject matter.
Figure 3:
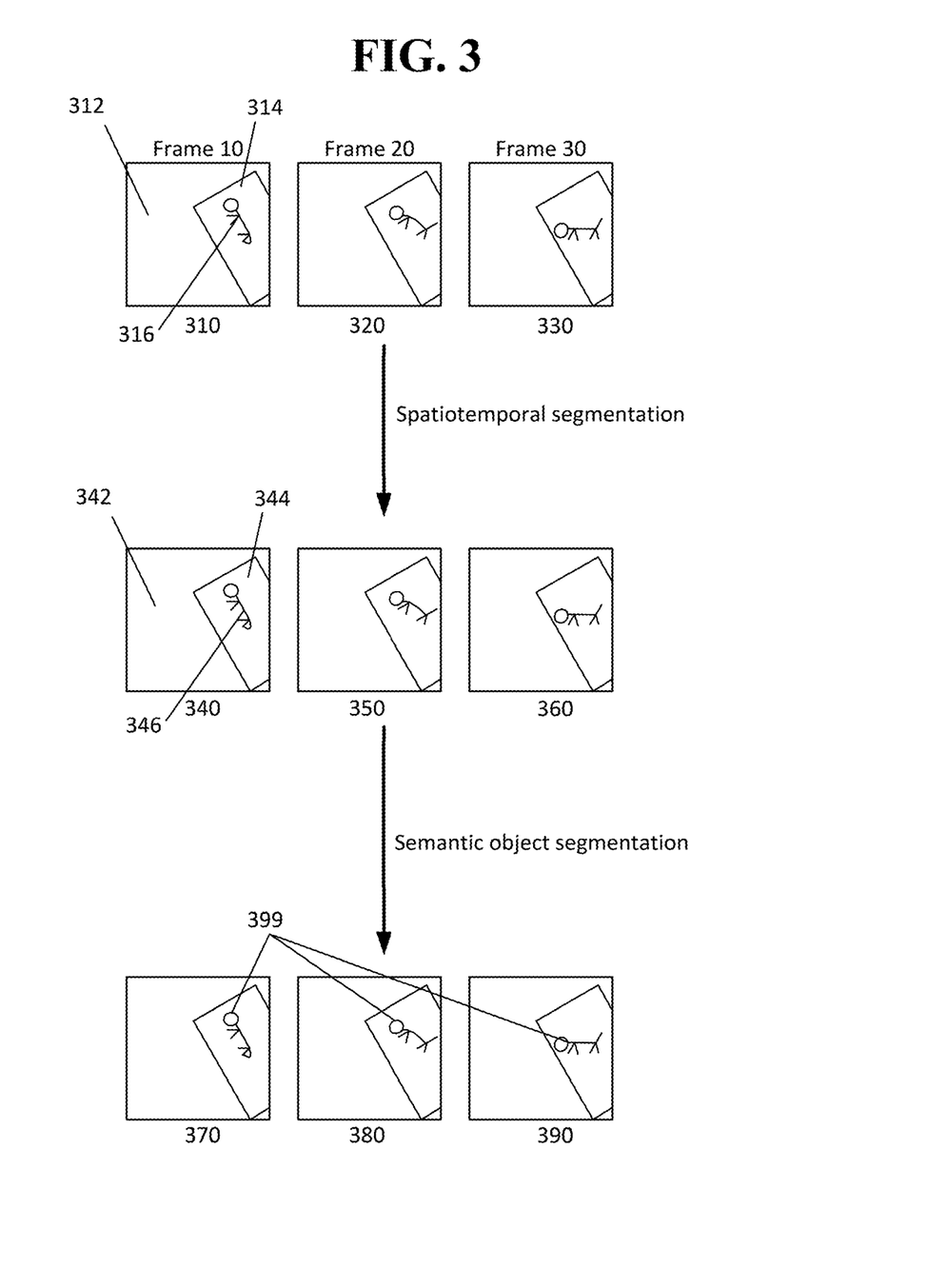
FIG. 3 is an example of a concept video that shows segmentation based on time and space in one step and semantic object segmentation in another.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
   a database for storing a plurality of media items;
   one or more computers connected to the database and configured to:
     obtain the plurality of media items, each of the plurality of media items being identified as either (i) a concept media item that has been classified as a media item in which a particular visual concept appears or (ii) a non-concept media item that has been classified as a media item in which the particular visual concept does not appear;
     obtain a plurality of concept segments, wherein each of the concept segments is a segment that has been extracted from a concept media item;
     obtain a plurality of non-concept segments, wherein each non-concept segment is a segment that has been extracted from a non-concept media item, wherein each concept segment and each non-concept segment is represented in a feature space;
     for each non-concept segment, identify a closest concept segment, wherein the closest concept segment is the concept segment that is closest to the non-concept segment of any of the plurality of concept segments, wherein the closest concept segment is identified based upon pairwise distances between all of the concept segments and all of the non-concept segments in the feature space;
     determine, for each concept segment, a respective count of instances in which the concept segment is identified as the closest concept segment to one of the non-concept segments;
     rank each concept segment such that the ranking reflects a respective likelihood that the concept segment contains the particular visual concept by ranking the concept segments such that concept segments having lower counts are favored over concept segments having higher counts; and
     label concept segments that are below a threshold rank in the ranking as not containing the particular visual concept.

2. The system of claim 1, the one or more computers further configured to:
   train a classifier based on at least a portion of the ranked concept segments and the non-concept segments; and
   classify a new media item using the classifier.

3. The system of claim 2, wherein the classifier is trained based on all of the ranked concept segments, and wherein the concept segments that are below the threshold rank are used as non-concept segments to train the classifier.

4. The system of claim 1, wherein each of the plurality of media items is identified as either a concept media item or a non-concept media item based on a weak label assigned to the media item before the obtaining of the media item.

5. The system of claim 1, the one or more computers further configured to segment the plurality of media items to generate the concept and non-concept segments.

6. The system of claim 1, wherein:
   each of the media items in the plurality of media items is a video; and
   each segment obtained for each of the videos is a spatiotemporal (3D) volume that is represented as a point in a high-dimensional feature space using a set of standard features computed over the segment.

7. A computer-implemented method, comprising:
obtaining, by one or more computers, a plurality of media items, each of the plurality of media items being identified as either (i) a concept media item that has been classified as a media item in which a particular visual concept appears or (ii) a non-concept media item that has been classified as a media item in which the particular visual concept does not appear;
obtaining, by the one or more computers, a plurality of concept segments, wherein each of the concept segments is a segment that has been extracted from a concept media item;
obtain a plurality of non-concept segments, wherein each non-concept segment is a segment that has been extracted from a non-concept media item, wherein each concept segment and each non-concept segment is represented in a feature space;
for each non-concept segment, identify a closest concept segment, wherein the closest concept segment is the concept segment that is closest to the non-concept segment of any of the plurality of concept segments, wherein the closest concept segment is identified based upon pairwise distances between all of the concept segments and all of the non-concept segments in the feature space;
determine, by the one or more computers and for each concept segment, a respective count of instances in which the concept segment is identified as the closest concept segment to one of the non-concept segments;
ranking, by the one or more computers, each concept segment such that the ranking reflects a respective likelihood that the concept segment contains the particular visual concept by ranking the concept segments such that concept segments having lower counts are favored over concept segments having higher counts; and
labeling, by the one or more computers, concept segments that are below a threshold rank in the ranking as not containing the particular visual concept.

8. The method of claim 7, further comprising:
training a classifier based on at least a portion of the ranked concept segments and the non-concept segments; and
classifying a new media item using the classifier.

9. The method of claim 8, wherein the classifier is trained based on all of the ranked concept segments, and wherein the concept segments below the threshold rank are used as non-concept segments to train the classifier.

10. The method of claim 7, wherein each of the plurality of media items is identified as either a concept media item or a non-concept media item based on a weak label assigned to the media item before the media item was obtained.

11. The method of claim 7, further comprising segmenting the plurality of media items to generate the concept and non-concept segments.

12. The method of claim 7, wherein:
each of the media items in the plurality of media items is a video; and
each segment obtained for each of the videos is a spatiotemporal (3D) volume that is represented as a point in a high-dimensional feature space using a set of standard features computed over the segment.

13. One or more non-transitory computer storage media storing instructions that when executed by one or more computers cause the one or more computers to perform operations comprising:
obtaining, by one or more computers, a plurality of media items, each of the plurality of media items being identified as either (i) a concept media item that has been classified as a media item in which a particular visual concept appears or (ii) a non-concept media item that has been classified as a media item in which the particular visual concept does not appear;
obtaining, by the one or more computers, a plurality of concept segments, wherein each of the concept segments is a segment that has been extracted from a concept media item;
obtain a plurality of non-concept segments, wherein each non-concept segment is a segment that has been extracted from a non-concept media item, wherein each concept segment and each non-concept segment is represented in a feature space;
for each non-concept segment, identify a closest concept segment, wherein the closest concept segment is the concept segment that is closest to the non-concept segment of any of the plurality of concept segments, wherein the closest concept segment is identified based upon pairwise distances between all of the concept segments and all of the non-concept segments in the feature space;
determine, by the one or more computers and for each concept segment, a respective count of instances in which the concept segment is identified as the closest concept segment to one of the non-concept segments;
ranking, by the one or more computers, each concept segment such that the ranking reflects a respective likelihood that the concept segment contains the particular visual concept by ranking the concept segments such that concept segments having lower counts are favored over concept segments having higher counts; and
labeling, by the one or more computers, concept segments that are below a threshold rank in the ranking as not containing the particular visual concept.

* * * * *